United States Patent
Paladugu et al.

(10) Patent No.: US 11,659,369 B2
(45) Date of Patent: May 23, 2023

(54) DISTRIBUTED SIDELINK (SL) ARCHITECTURE AND PROTOCOL STACK

(71) Applicant: QUALCOMM Incorporated, San Diego, CA (US)

(72) Inventors: Karthika Paladugu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/185,780

(22) Filed: Feb. 25, 2021

(65) Prior Publication Data

US 2021/0274326 A1    Sep. 2, 2021

Related U.S. Application Data

(60) Provisional application No. 62/983,393, filed on Feb. 28, 2020.

(51) Int. Cl.
*H04W 4/40*   (2018.01)
*H04W 76/12*  (2018.01)
*H04W 92/02*  (2009.01)

(52) U.S. Cl.
CPC .......... *H04W 4/40* (2018.02); *H04W 76/12* (2018.02); *H04W 92/02* (2013.01)

(58) Field of Classification Search
CPC ....... H04W 4/40; H04W 76/12; H04W 92/02; H04W 4/70; H04W 88/085; H04W 80/00; H04W 76/14; H04W 92/18
See application file for complete search history.

(56) References Cited

U.S. PATENT DOCUMENTS

| 2017/0303322 A1* | 10/2017 | Watfa | H04W 76/23 |
| 2020/0163005 A1* | 5/2020 | Rao | H04W 8/24 |

(Continued)

FOREIGN PATENT DOCUMENTS

| EP | 3783931 A1 | 2/2021 |

OTHER PUBLICATIONS

Third Generation Partnership Project: "3rd Generation Partnership Project; Technical Specification Group Radio Access Network; Study on New Radio Access Technology; Radio Access Architecture and Interfaces (Release 14)", 3GPP TR 38.801, V14.0.0, Mar. 2017 (Mar. 2017), pp. 1-91, XP051298041, [retrieved on Apr. 3, 2017].

(Continued)

*Primary Examiner* — Abdullahi Ahmed
(74) *Attorney, Agent, or Firm* — Seyfarth Shaw LLP

(57) ABSTRACT

A sidelink node has a distributed processing architecture for wireless communications. The sidelink node comprising a central unit configured to perform sidelink node functions. The sidelink node also comprises distributed units including a first distributed unit and a second distributed unit. Each distributed unit is coupled to the central unit and controlled by the central unit. Each distributed unit is configured to perform a subset of the sidelink node functions. The sidelink node comprises radio units including a first set of radio units coupled to and controlled by the first distribution unit and a second set of radio units coupled to and controlled by the second distribution unit. Each radio unit is configured for sidelink transmission and reception.

30 Claims, 10 Drawing Sheets

(56) References Cited

U.S. PATENT DOCUMENTS

| | | | |
|---|---|---|---|
| 2020/0296696 A1* | 9/2020 | Goldhamer | H04W 4/70 |
| 2021/0058992 A1* | 2/2021 | Szilgyi | H04W 4/46 |
| 2021/0368417 A1* | 11/2021 | Luo | H04W 76/20 |
| 2021/0385865 A1* | 12/2021 | Mueck | H04W 74/006 |
| 2022/0015088 A1* | 1/2022 | Pateromichelakis | H04L 41/0853 |
| 2022/0095396 A1* | 3/2022 | Luo | H04W 76/11 |

OTHER PUBLICATIONS

Catt: "Analysis on Introduction of PC5 Signalling Protocol and Protocol Stacks for UE-to-Network Relay", 3GPP TSG RAN WG2 Meeting #89bis, 3GPP Draft; R2-151231, Bratislava, Slovakia; Apr. 19, 2015 (Apr. 19, 2015), pp. 1-4, XP050936189, Retrieved from the Internet: URL: http://www.3gpp.org/ftp/Meetings_3GPP_SYNC/RAN2/Docs/ [retrieved on Apr. 19, 2015].

CMCC: "Architectural Aspect of Split Options 3/5/7", 3GPP TSG RAN WG3 Meeting #93, 3GPP Draft; R3-161811, Goteborg, Sweden, Aug. 21, 2016, pp. 1-7, XP051127637, Retrieved from the Internet: URL: http://www.3gpp.org/ftp/Meetings_3GPP_SYNC/RAN3/Docs/ [retrieved on Aug. 21, 2016].

International Search Report and Written Opinion—PCT/US2021/020046—ISA/EPO—dated Jun. 4, 2021.

* cited by examiner

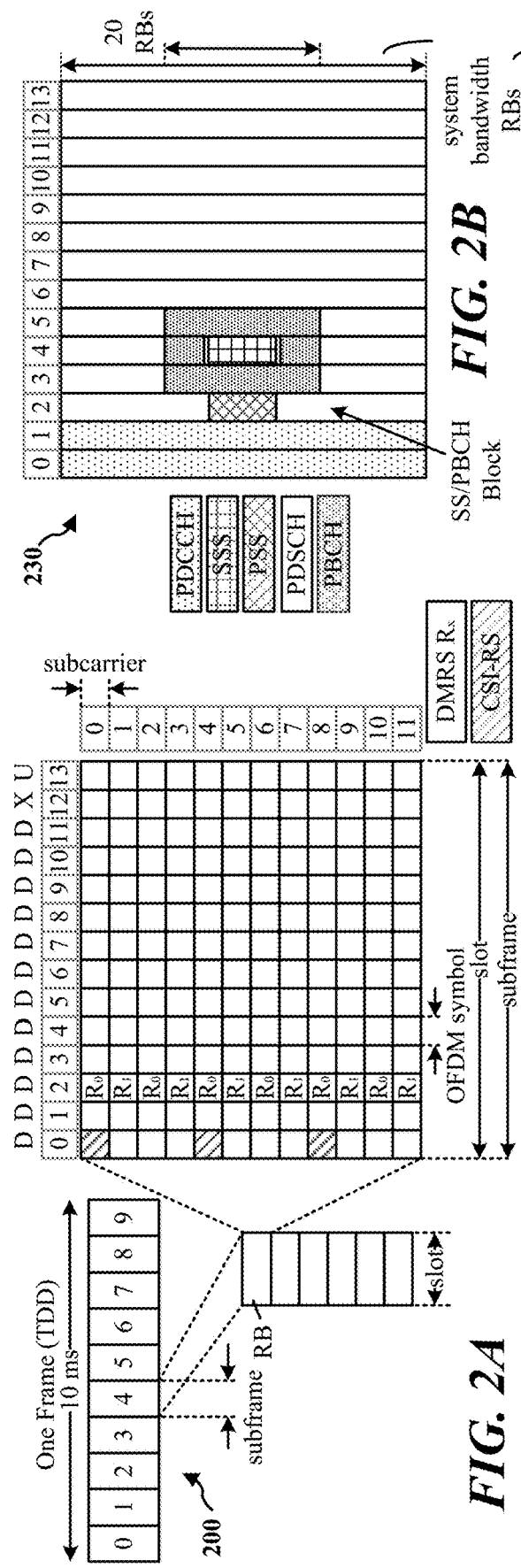
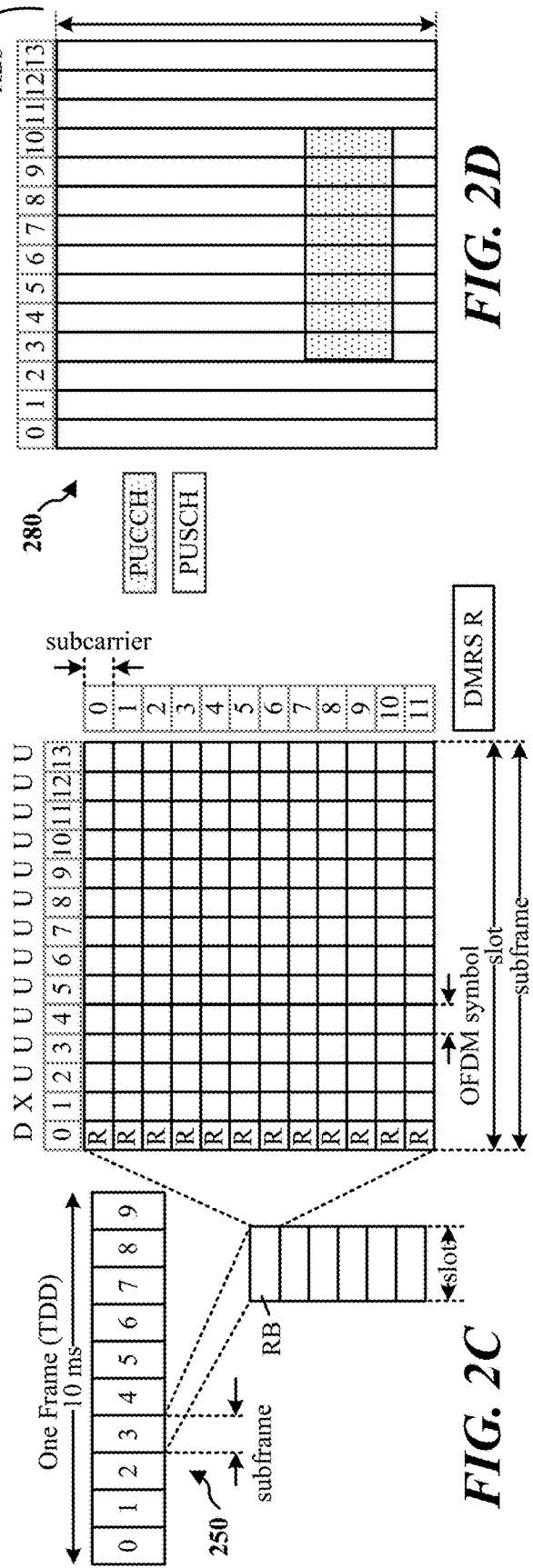

DISTRIBUTED SIDELINK (SL) ARCHITECTURE AND PROTOCOL STACK

CROSS-REFERENCE TO RELATED APPLICATION

The present application claims the benefit of U.S. Provisional Patent Application No. 62/983,393, filed on Feb. 28, 2020, and titled "DISTRIBUTED SIDELINK (SL) ARCHITECTURE AND PROTOCOL STACK," the disclosure of which is expressly incorporated by reference in its entirety.

BACKGROUND

Technical Field

Aspects of the present disclosure generally relate to wireless communications, and more particularly to a distributed sidelink (SL) architecture and protocol stack.

Introduction

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information about inclement weather, nearby accidents, road conditions, and/or other information may be conveyed to a driver via the vehicle related communications system. In some cases, vehicles may communicate directly with each other or to the infrastructure using device-to-device (D2D) communications over a D2D wireless link.

As the demands for vehicle related communications increase, different V2X communications systems compete for the same wireless communications resources. Accordingly, there is a need to improve the sharing of wireless communications resources.

SUMMARY

In one aspect of the present disclosure, a sidelink node includes a distributed processing architecture for wireless communications. The sidelink node comprises a central unit configured to perform sidelink node functions. The sidelink node further comprises a plurality of distributed units comprising a first distributed unit and a second distributed unit, each distributed unit coupled to the central unit and controlled by the central unit, each distributed unit configured to perform a subset of the sidelink node functions. The sidelink node further comprises a plurality of radio units comprising a first set of radio units coupled to and controlled by the first distribution unit and a second set of radio units coupled to and controlled by the second distribution unit, each radio unit configured for sidelink transmission and reception.

In another aspect of the present disclosure, a method of wireless communications by a sidelink node includes communicating control plane messages from a central unit control plane entity to another sidelink node or a sidelink user equipment (SL UE) via at least one distributed unit and at least one radio unit. The method further includes communicating user plane messages from a central unit user plane entity to the other sidelink node or the SL UE via the at least one distributed unit and the at least one radio unit.

Another aspect of the present disclosure is directed to a non-transitory computer-readable medium with non-transitory program code recorded thereon. The program code is executed by a sidelink node and includes program code to communicate control plane messages from a central unit control plane entity to another sidelink node or a sidelink user equipment (SL UE) via at least one distributed unit and at least one radio unit. The program code further includes program code to communicate user plane messages from a central unit user plane entity to the other sidelink node or the SL UE via the at least one distributed unit and the at least one radio unit.

In another aspect of the present disclosure, an apparatus having a distributed processing architecture for wireless communications includes means for performing sidelink node functions. The apparatus also includes means for performing a subset of the sidelink node functions, the means for performing the subset of the sidelink node functions coupled to and controlled by the means for performing sidelink node functions. The apparatus further includes means for sidelink transmitting and receiving, coupled to and controlled by the means for performing the subset of the sidelink node functions.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

DETAILED DESCRIPTION

Figure 1:
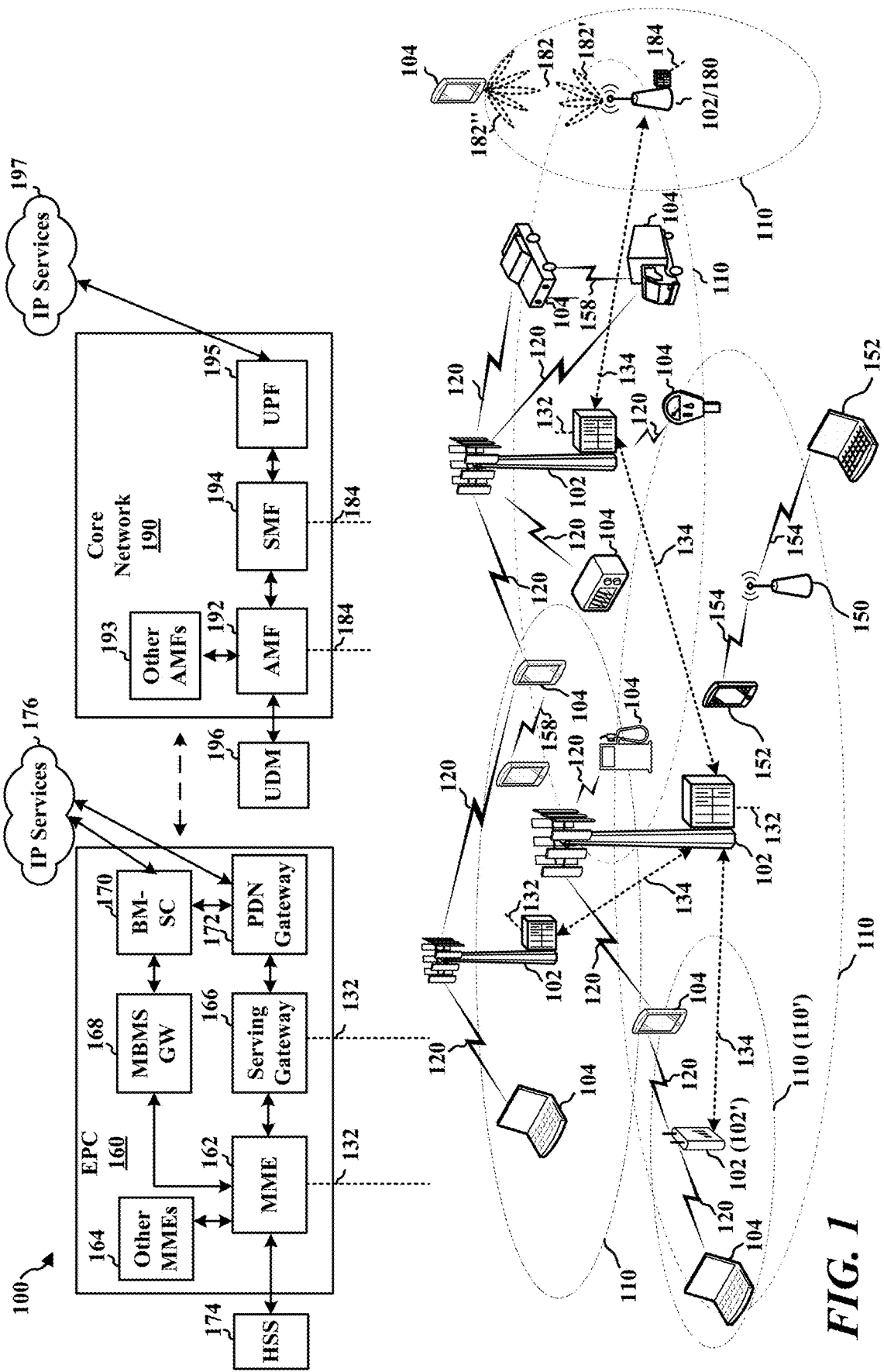
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In traditional cellular communications networks, wireless devices may communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include PC5 or direct communication mode, which is an air interface for device-to-device discovery and communications. D2D communications may also be referred to as sidelink communications.

Vehicle-to-everything or V2X describes communications between a vehicle and any other type of device. Information from sensors and other sources can be communicated between a vehicle and another device, such as a road side unit (RSU). New radio (NR) V2X is a type of 5G communications where the vehicles exchange information with RSUs (road side units) using NR V2X communications. In some cases, the RSUs may be connected to the backend server/network (such as a 5G network) and provide the information reported from vehicles to the server and vice versa.

RSUs are special nodes deployed to assist the vehicles by providing additional information. RSUs may be deployed at various locations to assist the vehicles. Each RSU may serve multiple V2X UEs. Under such deployment, the RSU appears like a base station or an access point providing connectivity for the vehicles to the network.

According to aspects of the present disclosure, when there are many RSUs deployed, a distributed processing architecture may be beneficial for the RSUs. That is, logical nodes may be defined for the RSU functionalities. Some of the logical nodes may be deployed in a cloud environment.

Cloud architecture/distributed processing for sidelink communications is also contemplated for non-V2X use cases. In this case, special nodes called sidelink assistance nodes (SLANs), similar to the RSUs, may assist the device-to-device communications. For example, gaming/interactive services may use SLANs to send and receive information from the backend server. According to the present disclosure, a cloud sidelink (SL) architecture refers to special nodes deployed with distributed processing for any sidelink use case.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
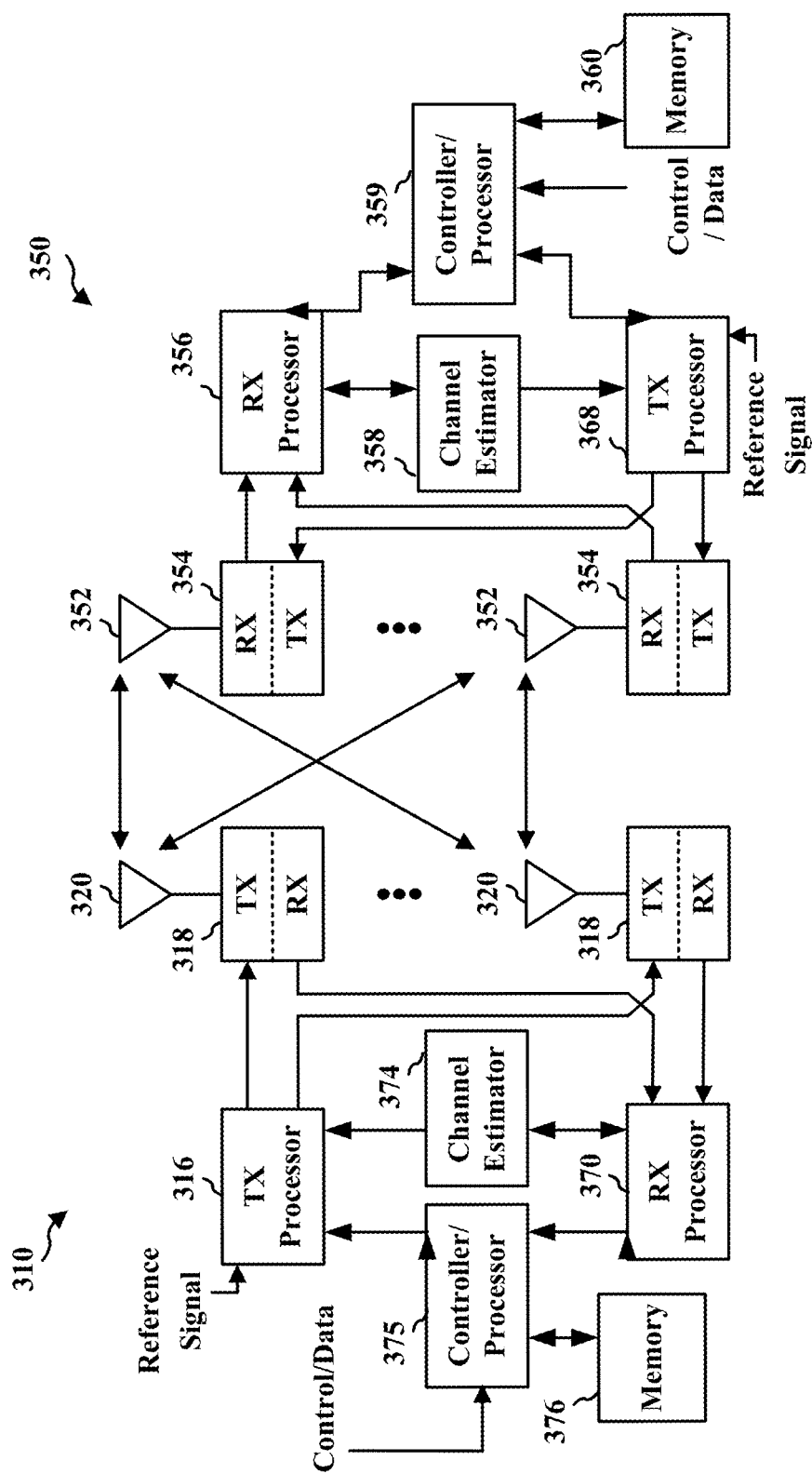
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
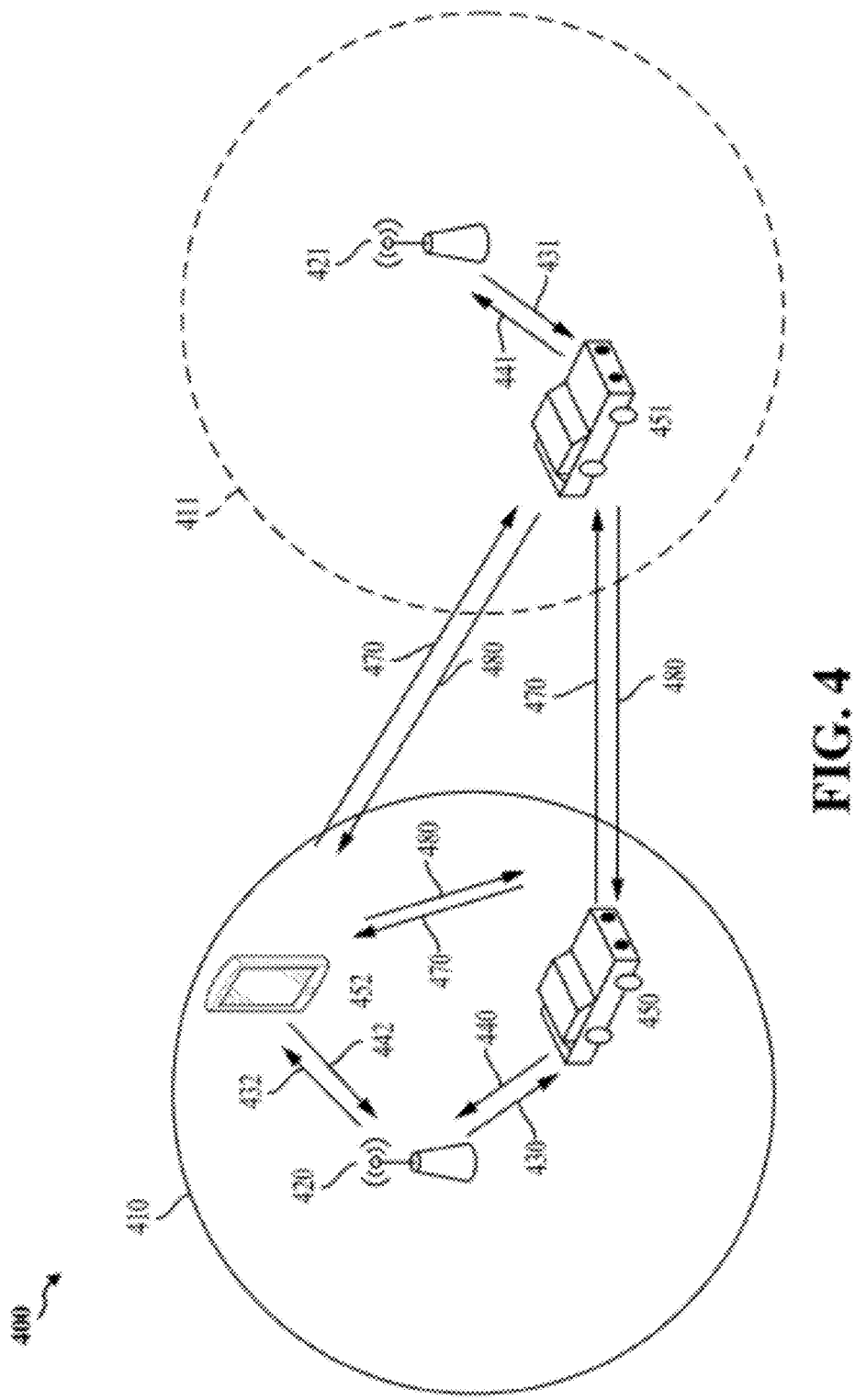
FIG. 4 is a diagram illustrating an example of a device-to-device (D2D) communications system, including vehicle-to-everything (V2X) communications, in accordance with various aspects of the present disclosure.

FIG. 4 is a diagram of a device-to-device (D2D) communications system 400, including vehicle-to-everything (V2X) communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on a first network 410 (e.g., of the first MNO) or another network, for example. The third UE 452 may be in D2D communications with the first UE 450 and/or second UE 451. A first road side unit (RSU) 420 may communicate with the third UE 452 via sidelink carriers 432, 442. The first network 410 operates in a first frequency spectrum and includes the first RSU 420 (e.g., communicating at least with the first UE 450, for example, as described in FIGS. 1-3.) The first RSU 420 may communicate with the first UE 450 via sidelink carriers 430, 440.

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include a second RSU 421 communicating with the second UE 451, for example, as described in FIGS. 1-3. The second RSU 421 may communicate with the second UE 451 via sidelink carriers 431, 441. The RSUs 420, 421 may be incorporated with traffic infrastructure (e.g., a traffic light, light pole, etc.) For example, the RSUs 420, 421 can be a traffic signal positioned at a side of a road. Additionally or alternatively, the RSUs 420, 421 may be stand-alone units.

The D2D communications (e.g., V2X communications and/or V2V communications) may also be carried out via one or more sidelink carriers 470, 480. The sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example. In some examples, the sidelink carriers 470, 480 may operate using the PC5 interface. The first UE 450 may transmit to one or more (e.g., multiple) devices, including to the second UE 451 and the RSU 420 via a sidelink carrier (e.g., 470, 480). The second UE 451 may transmit to one or more (e.g., multiple) devices, including to the first UE 450 or the RSU 421 via a sidelink carrier (e.g., 470, 480). The RSUs 420, 421 may forward data received from the transmitter UE 450, 451 to a cellular network (e.g., a gNB of a 5G network) (not shown) via an UL transmission. The 5G network (e.g., gNB) may transmit the data received from the RSUs 420, 421 to other UEs 450, 451 via a DL transmission.

In some aspects, the UL sidelink carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first RSU 420, a second RSU 421, a first UE 450, a second UE 451, and/or a third UE 452).

In some aspects, the RSU 420, 421, or another device, may include means for communicating, means for establishing, means for performing, means for sidelink transmitting and receiving, means for selecting, and means for managing. Such means may include one or more components of the UE 350 or base station 310 described in connection with FIG. 3.

Figure 5A:
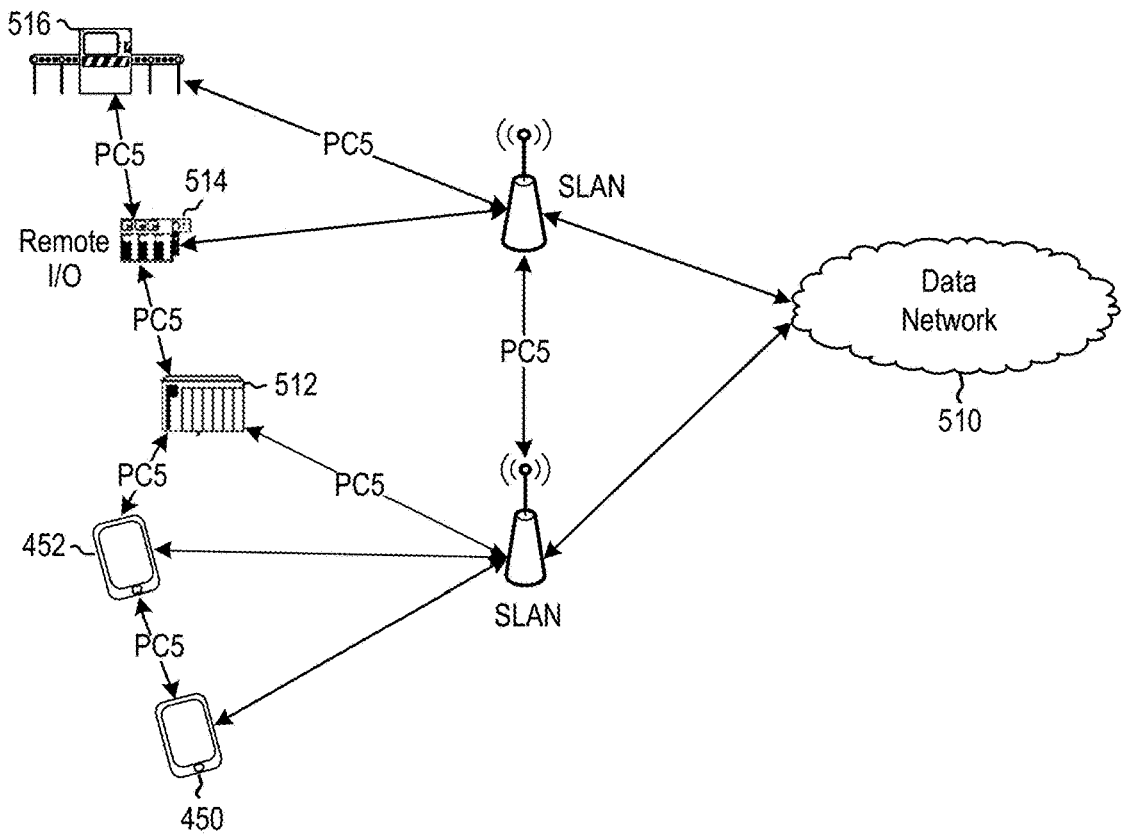
FIGS. 5A and 5B are diagrams illustrating use cases for distributed sidelink processing, in accordance with various aspects of the present disclosure.
Figure 5B:
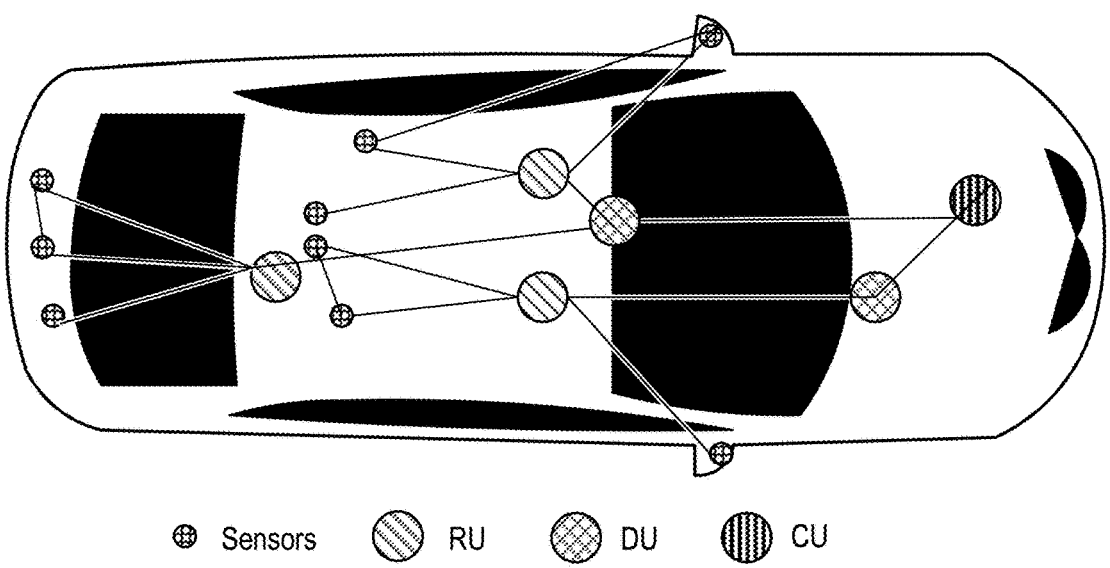

In certain aspects, a device, such as the RSUs 420, 421, may have a distributed processing architecture. The sidelink architecture may be enhanced to support a cloud-like environment. FIGS. 5A and 5B are diagrams illustrating use cases for distributed sidelink processing, in accordance with various aspects of the present disclosure. For example, as seen in FIG. 5A, an enterprise or factory may deploy sidelink assistance nodes (SLANs) supporting PC5 (licensed or unlicensed spectrum for PC5). Each SLAN may interface between a data network 510 and a UE 450, 452 or a factory/enterprise component 512, 514, 516. The interface between SLANs may be a PC5 link, as may be the interface between factory components 512, 514, 516 and UEs 450, 452.

FIG. 5B is a diagram illustrating an in-vehicle networking use case, in accordance with various aspects of the present disclosure. With in-vehicle networking (e.g., V2X), a distributed PC5 implementation is deployed in the vehicle for logical distribution of the processing within the vehicle. As seen in FIG. 5B, a central unit (CU), distributed units (DUs), and radio units (RUs) support PC5 with other information sources (e.g., sensors, electronic units, etc.) to provide a coordinated multipoint (CoMP) like coverage in the car.

Figure 6:
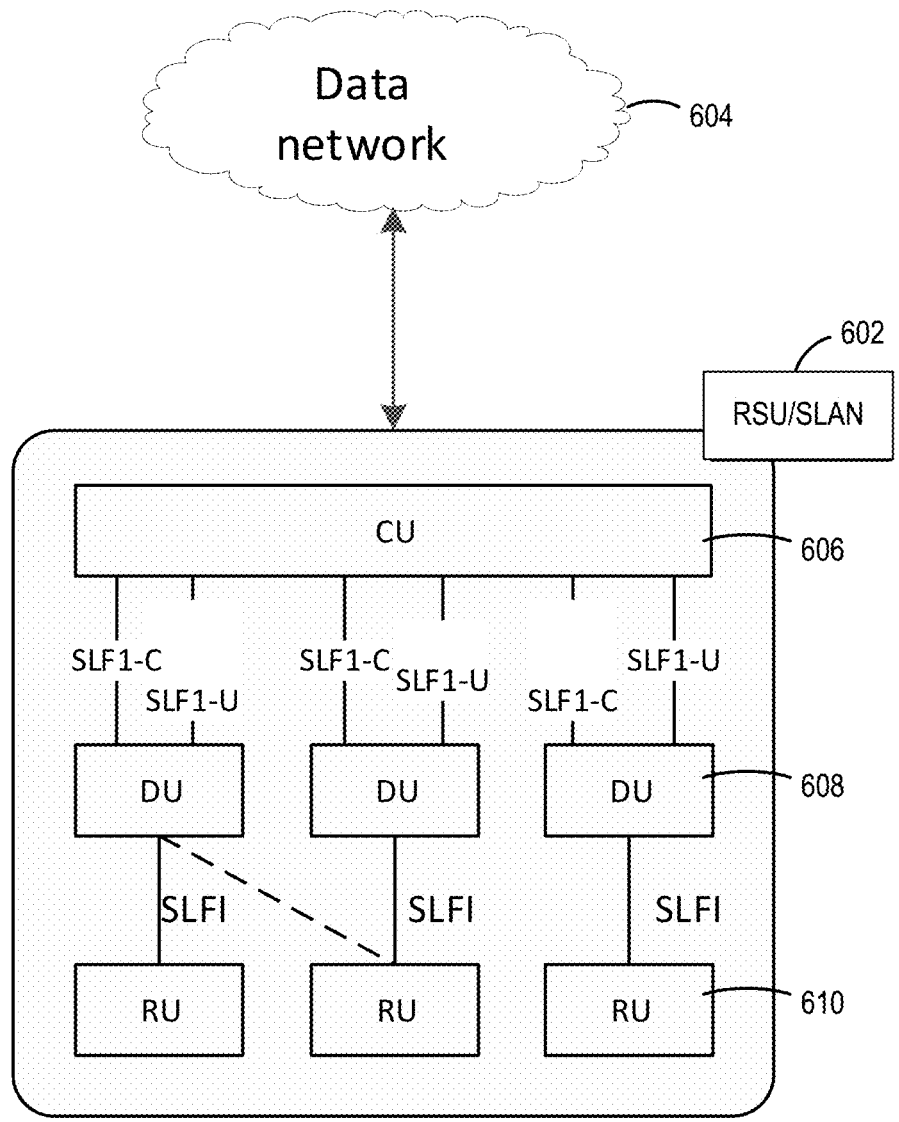
FIG. 6 is a block diagram illustrating an example of a distributed architecture, in accordance with various aspects of the present disclosure.

FIG. 6 is a block diagram illustrating an example of a distributed architecture, in accordance with various aspects of the present disclosure. An RSU/SLAN 602 is shown communicating with a data network 604. The RSU/SLAN 602 functionalities may be split into logical nodes. For example, a central unit (CU) 606 is a logical node that includes all RSU/SLAN functions except the functions allocated exclusively to the distributed units (DUs) 608. The central unit 606 controls the operation of the DUs 608.

Each distributed unit (DU) 608 is a logical node that includes, depending on a functional split option (discussed below), a subset of the RSU/SLAN functions. Each DU 608 connects to only one central unit 606. For the control plane, the SLF1-C (sidelink F1-control) interface is supported to communicate between the DUs 608 and the central unit 606. For the user plane, the SLF1-U (sidelink F1-user) interface may be supported to communicate between the DUs 608 and the central unit 606.

A radio unit (RU) 610 includes the radio transceiver unit for sidelink transmission and reception. Multiple RUs 610 may be controlled by one distributed unit 608. Each RU 610 is controlled by only one distributed unit 608. A sidelink fronthaul interface (SLFI) may be used to communicate between the distributed units 608 and the RUs 610. The RUs 610 may be deployed closer to the sidelink UE. The distributed unit 608 and central unit 606 may be deployed in the cloud.

Each RSU/SLAN 602 communicates with other RSU/SLANs 602 for mobility handling of remote UEs. Mobility handling includes the case where a UE moves from coverage of one RSU/SLAN 602 to another RSU/SLAN 602. There are at least two options for the inter-node communications. Option one employs enhancements to PC5 (e.g., PC5-S or PC5-RRC) to support remote UE mobility handling and data forwarding during mobility. Option two includes a new sidelink-to-everything (SLXn) interface to support inter-RSU communications. SLXn-AP (application protocol), SLXn-UP (user plane) procedures may be defined to support the mobility handling of remote UEs. In option two, the underlying physical transport may remain as PC5 with a new protocol layer defined over PC5, in one exemplary configuration.

Figure 7:
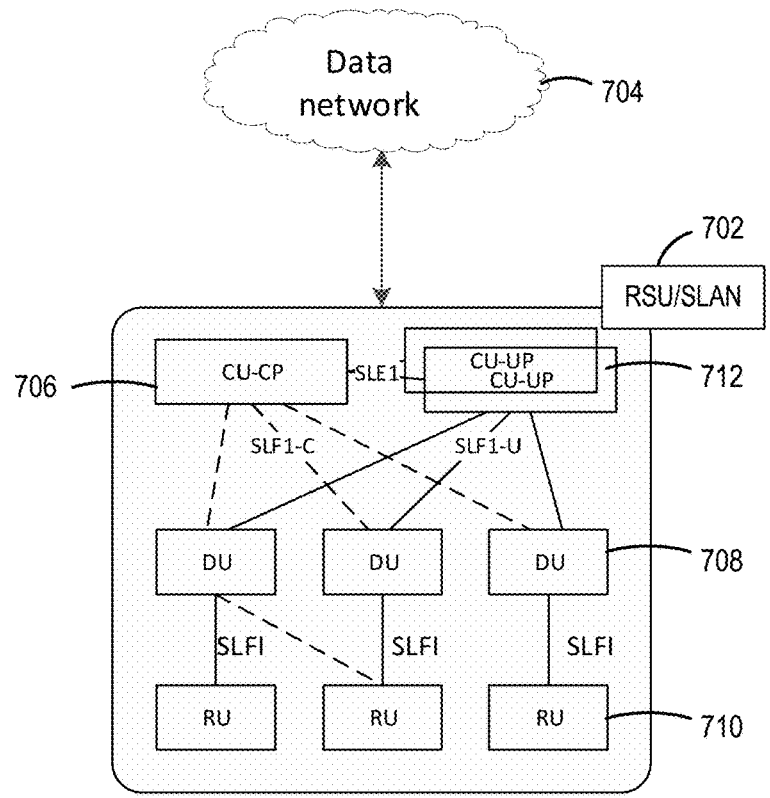
FIG. 7 is a block diagram illustrating a control plane/user plane split, in accordance with various aspects of the present disclosure.

FIG. 7 is a block diagram illustrating a control plane/user plane split, in accordance with various aspects of the present disclosure. An RSU/SLAN 702 is shown communicating with a data network 704. The RSU/SLAN architecture 702 in the central unit may be logically split into a control plane and multiple user plane handling entities. A central unit control plane (CU-CP) entity 706 may be connected to distributed units (DUs) 708 through the SLF1-C (sidelink F1-control) interface, for example. One distributed unit 708 is connected to only one CU-CP 706. Each central unit user plane (CU-UP) 712 may support user plane functionality for only certain types of services and bearers. The CU-CP 706 selects the appropriate CU-UP(s) 712 for the requested services for a UE.

The central unit user plane (CU-UP) 712 is for data forwarding, data routing, encryption, security handling, and other user plane functions. The CU-UP 712 communicates with the CU-CP 706 through the SLE1 interface, for example. The communications define the context for the user, including any control signaling exchange over the SLE1 interface to set up the user plane context for user plane functionality management (e.g., bearer management). The CU-UP 712 is connected to the distributed units 708 through the SLF1-U (sidelink F1-user) interface, for example. Each CU-UP 712 is connected to only one CU-CP 706.

Each distributed unit 708 may be connected to multiple CU-UPs 712 under the control of the same CU-CP 706. One CU-UP 712 may be connected to multiple distributed units 708 under control of the same CU-CP 706. The CU-CP 706 may transmit to one distributed unit 708 or multiple distributed units 708 depending on where the context is managed by the CU-CP 706. In other words, connectivity between a CU-UP 712 and a distributed unit 708 is established by the CU-CP 706 using bearer context management functions.

Each distributed unit 708 communicates with at least one radio unit 710 via the SLFI (sidelink fronthaul interface), for example.

Figure 8:
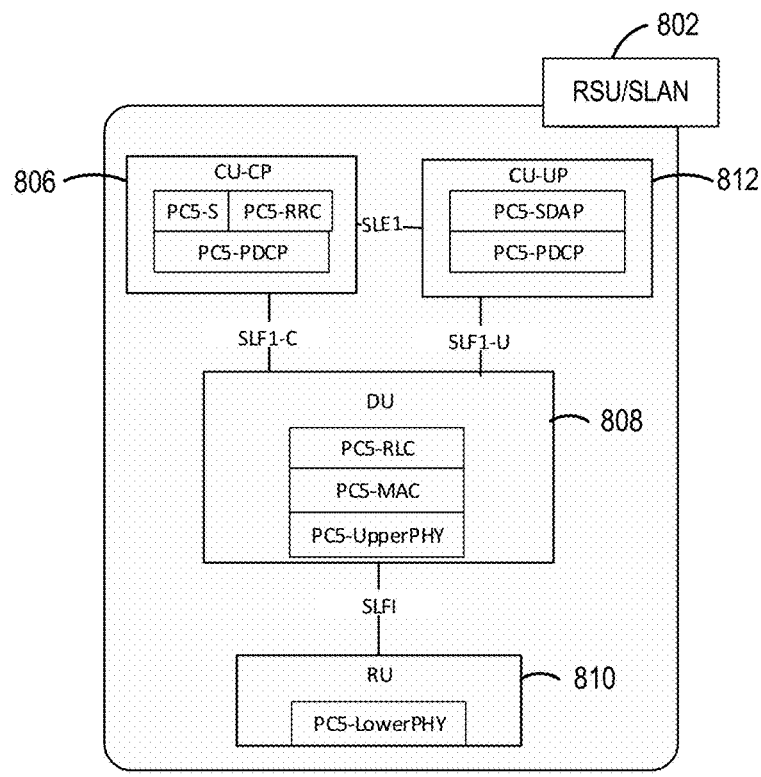
FIG. 8 is a block diagram illustrating a protocol stack split, in accordance with various aspects of the present disclosure.

FIG. 8 is a block diagram illustrating a protocol stack split, in accordance with various aspects of the present disclosure. Referring to FIG. 8, an exemplary PC5 protocol stack split will be discussed. The PC5 stack and functionalities of an RSU/SLAN 802 may be distributed into logical nodes including a central unit (e.g., CU-CP 806 and CU-UP 812), distributed unit 808, and radio unit 810. According to this aspect of the present disclosure, the radio unit 810 handles the PC5 lower physical layer functions. The radio unit 810 communicates with the distributed unit 808 via the SLF1 interface, for example. The distributed unit 808 manages the radio link control (PC5-RLC) channels, medium access control (PC5-MAC) layer, and upper physical layer functions for the PC5 link.

The CU-CP 806 is responsible for control plane handling of the PC5 link between the RSU/SLAN 802 and sidelink UEs. The CU-CP 806 handles PC5-S signaling for connection setup (PC5-S), radio resource control (PC5-RRC) for access stratum configuration and capability exchange, and packet data convergence protocol (PC5-PDCP) functions to support the control plane traffic of the sidelink UE. The CU-UP 812 manages the user plane connections between the RSU/SLAN 802 and sidelink UEs. The CU-UP 812 handles service data adaptation protocol (PC5-SDAP) and the packet data convergence protocol (PC5-PDCP) functions to support the user plane traffic of the sidelink UE.

Figure 9:
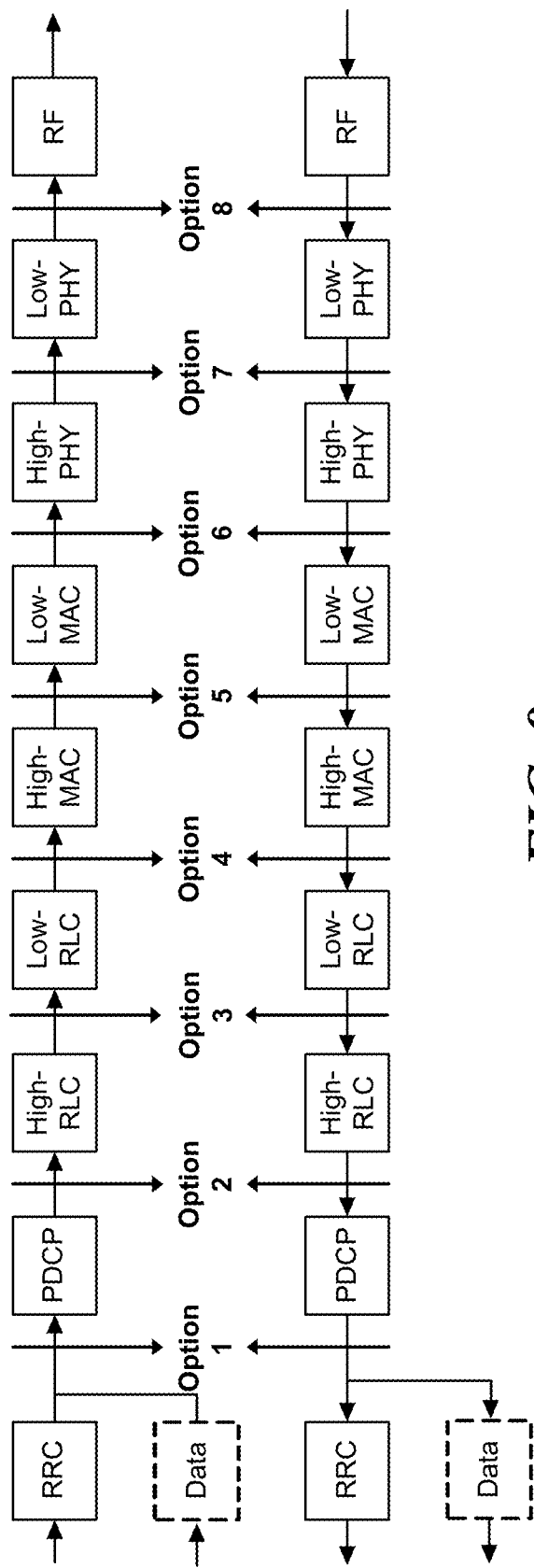
FIG. 9 is a block diagram illustrating exemplary functional splits between a central unit and a distributed unit, in accordance with various aspects of the present disclosure.

FIG. 9 is a block diagram illustrating exemplary functional splits between a central unit and a distributed unit, in accordance with various aspects of the present disclosure. Although a particular protocol stack split has been described, the RSU/SLAN may be deployed with other protocol stack split options between the distributed unit and central unit, as seen for example in FIG. 9 and described in 3GPP TR 38.801, section 11 "RAN logical architecture for NR," the disclosure of which is expressly incorporated by reference in its entirety.

Figure 10:
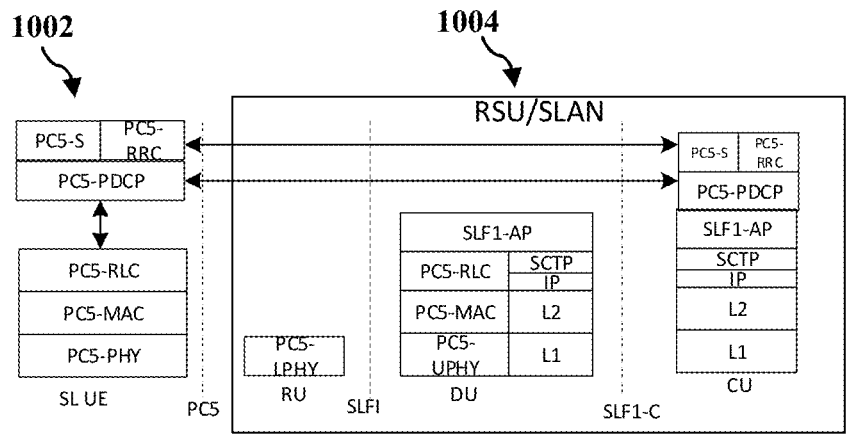
FIG. 10 is a block diagram illustrating a control plane protocol stack, in accordance with various aspects of the present disclosure.

FIG. 10 is a block diagram illustrating a control plane protocol stack, in accordance with various aspects of the present disclosure. Referring to FIG. 10, communications between a sidelink UE (SL UE) 1002 and an RSU/SLAN control plane 1004 having a distributed processing architecture is now discussed. The sidelink UE's PC5-S, PC5-RRC, and PC5-PDCP layers communicate with the corresponding layers in the central unit of the RSU/SLAN 1004. Control information within the sidelink UE 1002 also passes from the PC5-RLC (radio link control) layer to the PC5-MAC (media access control) layer to the PC5-PHY (physical) layer. From there, the control information passes to the radio unit PC5-lower PHY layer. The radio unit communicates the information to the PC5-upper PHY layer in the distributed unit, which then processes the information up through the PC5-MAC and PC5-RLC layers to the SLF1 application protocol (SLF1-AP), for example. The SLF1 application protocol, which performs UE context management, generates messages for transport to the central unit. These messages may be transported via SCTP (stream control transfer protocol), IP, L2 (layer 2), and L1 (layer 1) through a wired network, for example. These SCTP messages are not managed by PC5.

Figure 11:
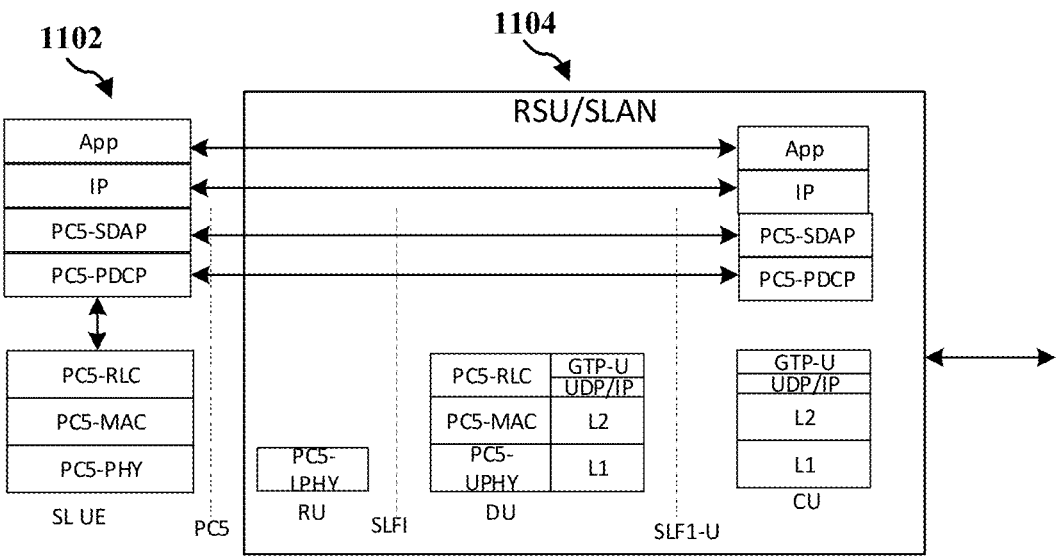
FIG. 11 is a block diagram illustrating a user plane protocol stack, in accordance with various aspects of the present disclosure.

FIG. 11 is a block diagram illustrating a user plane protocol stack, in accordance with various aspects of the present disclosure. FIG. 11 shows user plane communications between a sidelink UE (SL UE) 1102 and an RSU/SLAN control plane 1104 with the distributed processing architecture. After the control plane signaling is completed, the user plane signaling may route the data. For example, the sidelink UE 1102 processes the user application data down through the PC5 stack to the PC5-PHY layer. The data is then sent to the radio unit PC5-lower PHY layer, which passes the data to the distributed unit PC5-upper PHY layer. The distributed unit processes the data up to the PC5-RLC layer, which communicates with the GTP-U (general packet radio service (GPRS) tunneling protocol-user plane) for tunneling the user plane packets to the central unit.

As indicated above, FIGS. 4-11 are provided as examples. Other examples may differ from what is described with respect to FIGS. 4-11.

Figure 12:
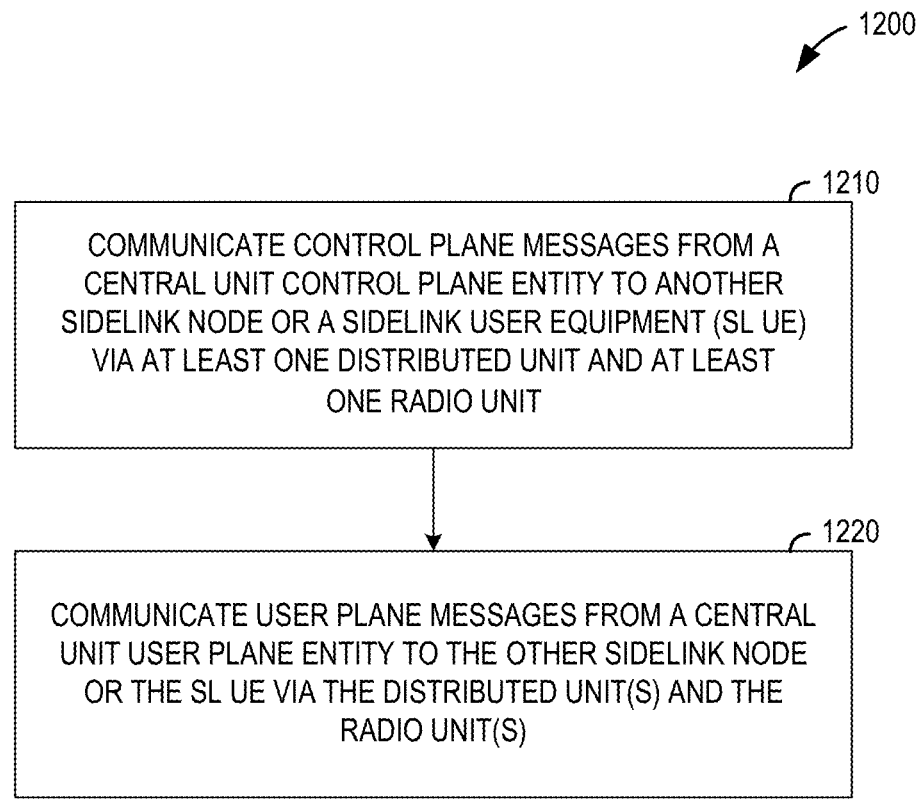
FIG. 12 is a flow diagram illustrating an example process performed, for example, by sidelink node, in accordance with various aspects of the present disclosure.

FIG. 12 is a flow diagram illustrating an example method of wireless communications, performed by a sidelink node, in accordance with various aspects of the present invention. A process 1200 is an example of communications with distributed sidelink (SL) architecture and protocol stack.

As shown in FIG. 12, in some aspects, the process 1200 may include communicating control plane messages from a central unit control plane entity to another sidelink node or a sidelink user equipment (SL UE) via at least one distributed unit and at least on radio unit (block 1210). For example, the UE (e.g., using the antenna 352, RX/TX 354, TX processor 368, RX processor 356, controller/processor 359, memory 360, and/or the like) or the base station (e.g., using the antenna 320, RX/TX 318, TX processor 316, RX processor 370, controller/processor 375, memory 376, and/or the like) may communicate control plane messages.

As shown in FIG. 12, in some aspects, the process 1200 may include communicating user plane messages from a central unit user plane entity to the other sidelink node or the SL UE via the at least one distributed unit and the at least one radio unit (block 1220). For example, the UE (e.g., using the antenna 352, RX/TX 354, TX processor 368, RX processor 356, controller/processor 359, memory 360, and/or the like) or the base station (e.g., using the antenna 320, RX/TX 318, TX processor 316, RX processor 370, controller/processor 375, memory 376 and or the like) may communicate user plane messages.

Implementation examples are described in the following numbered clauses.

1. A sidelink node having a distributed processing architecture for wireless communications, the sidelink node comprising:
    a central unit configured to perform sidelink node functions;
    a plurality of distributed units comprising a first distributed unit and a second distributed unit, each distributed unit coupled to the central unit and controlled by the central unit, each distributed unit configured to perform a subset of the sidelink node functions; and
    a plurality of radio units comprising a first set of radio units coupled to and controlled by the first distribution unit and a second set of radio units coupled to and controlled by the second distribution unit, each radio unit configured for sidelink transmission and reception.
2. The sidelink node of clause 1, in which the sidelink node comprises a road side unit (RSU), a sidelink (SL) user equipment (UE), and/or a sidelink assistance node (SLAN).
3. The sidelink node of clauses 1 or 2, in which at least one of the plurality of radio units is configured to communicate with another sidelink node or a sidelink (SL) user equipment (UE).
4. The sidelink node of any of the proceeding clauses, in which the central unit comprises:
    a control plane coupled to each distributed unit and configured to select at least one of a plurality of user planes for requested services, in which each distributed unit couples to the control plane; and
    the plurality of user planes, each user plane coupled to the control plane, in which each distributed unit couples to the plurality of user planes under control of the control plane, each user plane coupled to the plurality of distributed units under control of the control plane.
5. The sidelink node of any of the proceeding clauses, in which the central unit comprises a first portion of a PC5 stack, each distributed unit comprises a second portion of the PC5 stack, and each radio unit comprises a third portion of the PC5 stack.
6. The sidelink node of any of the proceeding clauses, in which a central unit control plane (CU-CP) is configured to manage a control plane of a PC5 link between the sidelink node and another sidelink node or a sidelink user equipment (SL UE), the control plane of the central unit comprising PC5-radio resource control (RRC) functionality, PC5-S functionality and PC5-PDCP (packet data convergence protocol) functionality.
7. The sidelink node of any of the proceeding clauses, in which each of a plurality of user planes of the central unit is configured to manage user plane connections between the sidelink node and another sidelink node or a sidelink user equipment (SL UE), each user plane of the central unit comprising PC5-PDCP (packet data convergence protocol) functionality and PC5-SDAP (service data adaptation protocol) functionality.
8. The sidelink node of any of the proceeding clauses, in which each distributed unit is configured to manage RLC (radio link control), MAC (media access control), and upper layer PHY (physical) functionality of a PC5 link between the sidelink node and another sidelink node or a sidelink user equipment (SL UE), each distributed unit comprising an application protocol to manage a control plane context between each distributed unit and the central unit.
9. The sidelink node of any of the proceeding clauses, in which each radio unit is configured to manage lower layer PHY (physical) functionality of a PC5 link between the sidelink node and another sidelink node or a sidelink user equipment (SL UE).
10. The sidelink node of any of the proceeding clauses, configured to communicate with another sidelink node via an enhanced PC5 interface or an SLXn interface.
11. A method of wireless communications by a sidelink node, comprising:
    communicating control plane messages from a central unit control plane entity to another sidelink node or a sidelink user equipment (SL UE) via at least one distributed unit and at least one radio unit; and
    communicating user plane messages from a central unit user plane entity to the other sidelink node or the SL UE via the at least one distributed unit and the at least one radio unit.
12. The method of clause 11, in which communicating the control plane messages is via a PC5 interface and communicating the user plane messages is via the PC5 interface.

13. The method of clauses 11 or 12, in which communicating the control plane messages is via an SLXn interface and communicating the user plane messages is via the SLXn interface.
14. The method of any of the clauses 11-13, in which communicating the control plane messages is via a PC5 interface and a tunneling protocol, and communicating the user plane messages is via the PC5 interface and the tunneling protocol.
15. The method of any of the clauses 11-14, further comprising establishing connectivity between the at least one distributed unit and the central unit control plane entity using bearer context management functions.
16. The method of any of the clauses 11-15, further comprising:
   managing, by the central unit control plane entity, control plane functions of PC5 links to the other sidelink node or the SL UE;
   managing, by the central unit user plane entity, user plane functions of the PC5 links to the other sidelink node or the SL UE;
   managing, by the at least one distributed unit, RLC (radio link control) layer functions, MAC (media access control) layer functions and upper physical layer functions of the PC5 links to the other sidelink node or the SL UE; and
   managing, by the at least one radio unit, lower physical layer functions of the PC5 links to the other sidelink node or the SL UE.
17. A non-transitory computer-readable medium having program code recorded thereon, the program code executed by a sidelink node and comprising:
   program code to communicate control plane messages from a central unit control plane entity to another sidelink node or a sidelink user equipment (SL UE) via at least one distributed unit and at least one radio unit; and
   program code to communicate user plane messages from a central unit user plane entity to the other sidelink node or the SL UE via the at least one distributed unit and the at least one radio unit.
18. The computer readable medium of clause 17, in which the the program code to communicate the control plane messages communicates via a PC5 interface and the program code to communicate the user plane messages communicates via the PC5 interface.
19. The computer readable medium of clauses 17 or 18, in which the the program code to communicate the control plane messages communicates via an SLXn interface and the program code to communicate the user plane messages communicates via the SLXn interface.
20. The computer readable medium of any of the clauses 17-19, in which the program code to communicate the control plane messages communicates via a PC5 interface and a tunneling protocol, and the program code to communicate the user plane messages communicates via the PC5 interface and the tunneling protocol.
21. The computer readable medium of any of the clauses 17-20, further comprising program code to establish connectivity between the at least one distributed unit and the central unit control plane entity using bearer context management functions.
22. The computer readable medium of any of the clauses 17-21, further comprising:
   program code to manage a control plane of a PC5 link with the central unit control plane entity;
   program code to manage user plane connections of the PC5 link with the central unit user plane entity;
   program code to manage RLC (radio link control) layer functions, MAC (media access control) layer functions and upper physical layer functions of the PC5 link with the at least one distributed unit; and
   program code to manage lower physical layer functions of the PC5 link with the at least one radio unit.
23. An apparatus having a distributed processing architecture for wireless communications, comprising:
   means for performing sidelink node functions;
   means for performing a subset of the sidelink node functions, the means for performing the subset of the sidelink node functions coupled to and controlled by the means for performing sidelink node functions; and
   means for sidelink transmitting and receiving, coupled to and controlled by the means for performing the subset of the sidelink node functions.
24. The apparatus of clause 23, comprising a road side unit (RSU), a sidelink (SL) user equipment (UE), and/or a sidelink assistance node (SLAN).
25. The apparatus of clauses 23 or 24, in which the means for sidelink transmitting and receiving comprises means for communicating with a sidelink node or a sidelink (SL) user equipment (UE).
26. The apparatus of any of the clauses 23-25, in which the means for performing sidelink functions comprises means for selecting at least one of a plurality of user planes for requested services.
27. The apparatus of any of the clauses 23-26, in which the means for performing sidelink functions comprises a first portion of a PC5 stack, the means for performing the subset of the sidelink functions comprises a second portion of the PC5 stack, and the means for sidelink transmitting and receiving comprises a third portion of the PC5 stack.
28. The apparatus of any of the clauses 23-27, in which the means for performing sidelink node functions comprises means for managing a control plane of a PC5 link with another sidelink node or a sidelink user equipment (SL UE), the control plane comprising PC5-radio resource control (RRC) functionality, PC5-S functionality and PC5-PDCP (packet data convergence protocol) functionality.
29. The apparatus of any of the clauses 23-28, in which the means for performing sidelink node functions comprises means for managing user plane connections with another sidelink node or a sidelink user equipment (SL UE), each user plane connection comprising PC5-PDCP (packet data convergence protocol) functionality and PC5-SDAP (service data adaptation protocol) functionality.
30. The apparatus of any of the clauses 23-29, further comprising means for communicating with a sidelink node via an enhanced PC5 interface or an SLXn interface.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A sidelink node having a distributed processing architecture for wireless communications, the sidelink node comprising:
    a central unit configured to perform sidelink node functions;
    a plurality of distributed units comprising a first distributed unit and a second distributed unit, each distributed unit coupled to the central unit and controlled by the central unit, each distributed unit configured to perform a subset of the sidelink node functions; and
    a plurality of radio units comprising a first set of radio units coupled to and controlled by the first distribution unit and a second set of radio units coupled to and controlled by the second distribution unit, each radio unit separate from each distributed unit and configured for sidelink transmission and reception.

2. The sidelink node of claim 1, in which the sidelink node comprises a road side unit (RSU), a sidelink (SL) user equipment (UE), and/or a sidelink assistance node (SLAN).

3. The sidelink node of claim 1, in which at least one of the plurality of radio units is configured to communicate with another sidelink node or a sidelink (SL) user equipment (UE).

4. The sidelink node of claim 1, in which the central unit comprises:
    a control plane coupled to each distributed unit and configured to select at least one of a plurality of user planes for requested services, in which each distributed unit couples to the control plane; and
    the plurality of user planes, each user plane coupled to the control plane, in which each distributed unit couples to the plurality of user planes under control of the control plane, each user plane coupled to the plurality of distributed units under control of the control plane.

5. The sidelink node of claim 1, in which the central unit comprises a first portion of a PC5 stack, each distributed unit comprises a second portion of the PC5 stack, and each radio unit comprises a third portion of the PC5 stack.

6. The sidelink node of claim 1, in which a central unit control plane (CU-CP) is configured to manage a control plane of a PC5 link between the sidelink node and another sidelink node or a sidelink user equipment (SL UE), the control plane of the central unit comprising PC5-radio resource control (RRC) functionality, PC5-S functionality and packet data convergence protocol (PC5-PDCP) functionality.

7. The sidelink node of claim 1, in which each of a plurality of user planes of the central unit is configured to manage user plane connections between the sidelink node and another sidelink node or a sidelink user equipment (SL UE), each user plane of the central unit comprising PC5-PDCP (packet data convergence protocol) functionality and service data adaptation protocol (PC5-SDAP) functionality.

8. The sidelink node of claim 1, in which each distributed unit is configured to manage radio link control (RLC), media access control (MAC), and upper layer physical (PHY) functionality of a PC5 link between the sidelink node and another sidelink node or a sidelink user equipment (SL UE), each distributed unit comprising an application protocol to manage a control plane context between each distributed unit and the central unit.

9. The sidelink node of claim 1, in which each radio unit is configured to manage lower layer physical (PHY) functionality of a PC5 link between the sidelink node and another sidelink node or a sidelink user equipment (SL UE).

10. The sidelink node of claim 1, configured to communicate with another sidelink node via an enhanced PC5 interface or an SLXn interface.

11. A method of wireless communications by a sidelink node, comprising:
    communicating control plane messages from a central unit control plane entity to another sidelink node or a sidelink user equipment (SL UE) via at least one distributed unit and at least one radio unit, which is separate from the at least one distributed unit; and
    communicating user plane messages from a central unit user plane entity to the other sidelink node or the SL UE via the at least one distributed unit and the at least one radio unit.

12. The method of claim 11, in which communicating the control plane messages is via a PC5 interface and communicating the user plane messages is via the PC5 interface.

13. The method of claim 11, in which communicating the control plane messages is via an SLXn interface and communicating the user plane messages is via the SLXn interface.

14. The method of claim 11, in which communicating the control plane messages is via via a PC5 interface and a tunneling protocol, and communicating the user plane messages is via the PC5 interface and the tunneling protocol.

15. The method of claim 11, further comprising establishing connectivity between the at least one distributed unit and the central unit control plane entity using bearer context management functions.

16. The method of claim 11, further comprising:
managing, by the central unit control plane entity, control plane functions of PC5 links to the other sidelink node or the SL UE;
managing, by the central unit user plane entity, user plane functions of the PC5 links to the other sidelink node or the SL UE;
managing, by the at least one distributed unit, radio link control (RLC) layer functions, media access control (MAC) layer functions and upper physical layer functions of the PC5 links to the other sidelink node or the SL UE; and
managing, by the at least one radio unit, lower physical layer functions of the PC5 links to the other sidelink node or the SL UE.

17. A non-transitory computer-readable medium having program code recorded thereon, the program code executed by a sidelink node and comprising:
program code to communicate control plane messages from a central unit control plane entity to another sidelink node or a sidelink user equipment (SL UE) via at least one distributed unit and at least one radio unit, which is separate from the at least one distributed unit; and
program code to communicate user plane messages from a central unit user plane entity to the other sidelink node or the SL UE via the at least one distributed unit and the at least one radio unit.

18. The computer readable medium of claim 17, in which the the program code to communicate the control plane messages communicates via a PC5 interface and the program code to communicate the user plane messages communicates via the PC5 interface.

19. The computer readable medium of claim 17, in which the the program code to communicate the control plane messages communicates via an SLXn interface and the program code to communicate the user plane messages communicates via the SLXn interface.

20. The computer readable medium of claim 17, in which the program code to communicate the control plane messages communicates via a PC5 interface and a tunneling protocol, and the program code to communicate the user plane messages communicates via the PC5 interface and the tunneling protocol.

21. The computer readable medium of claim 17, further comprising program code to establish connectivity between the at least one distributed unit and the central unit control plane entity using bearer context management functions.

22. The computer readable medium of claim 17, further comprising:
program code to manage a control plane of a PC5 link with the central unit control plane entity;
program code to manage user plane connections of the PC5 link with the central unit user plane entity;
program code to manage radio link control (RLC) layer functions, media access control (MAC) layer functions and upper physical layer functions of the PC5 link with the at least one distributed unit; and
program code to manage lower physical layer functions of the PC5 link with the at least one radio unit.

23. An apparatus having a distributed processing architecture for wireless communications, comprising:
means for performing sidelink node functions;
means for performing a subset of the sidelink node functions, the means for performing the subset of the sidelink node functions coupled to and controlled by the means for performing sidelink node functions; and
means for sidelink transmitting and receiving, coupled to and controlled by the means for performing the subset of the sidelink node functions, each means for sidelink transmitting and receiving being separate from each means for performing the subset of the sidelink node functions.

24. The apparatus of claim 23, comprising a road side unit (RSU), a sidelink (SL) user equipment (UE), and/or a sidelink assistance node (SLAN).

25. The apparatus of claim 23, in which the means for sidelink transmitting and receiving comprises means for communicating with a sidelink node or a sidelink (SL) user equipment (UE).

26. The apparatus of claim 23, in which the means for performing sidelink functions comprises means for selecting at least one of a plurality of user planes for requested services.

27. The apparatus of claim 23, in which the means for performing sidelink functions comprises a first portion of a PC5 stack, the means for performing the subset of the sidelink functions comprises a second portion of the PC5 stack, and the means for sidelink transmitting and receiving comprises a third portion of the PC5 stack.

28. The apparatus of claim 23, in which the means for performing sidelink node functions comprises means for managing a control plane of a PC5 link with another sidelink node or a sidelink user equipment (SL UE), the control plane comprising PC5-radio resource control (RRC) functionality, PC5-S functionality and packet data convergence protocol (PC5-PDCP) functionality.

29. The apparatus of claim 23, in which the means for performing sidelink node functions comprises means for managing user plane connections with another sidelink node or a sidelink user equipment (SL UE), each user plane connection comprising PC5-PDCP (packet data convergence protocol) functionality and service data adaptation protocol (PC5-SDAP).

30. The apparatus of claim 23, further comprising means for communicating with a sidelink node via an enhanced PC5 interface or an SLXn interface.

* * * * *